J. D. SHAFFER.
Garden-Tool.
No. 210,155.  Patented Nov. 19, 1878.
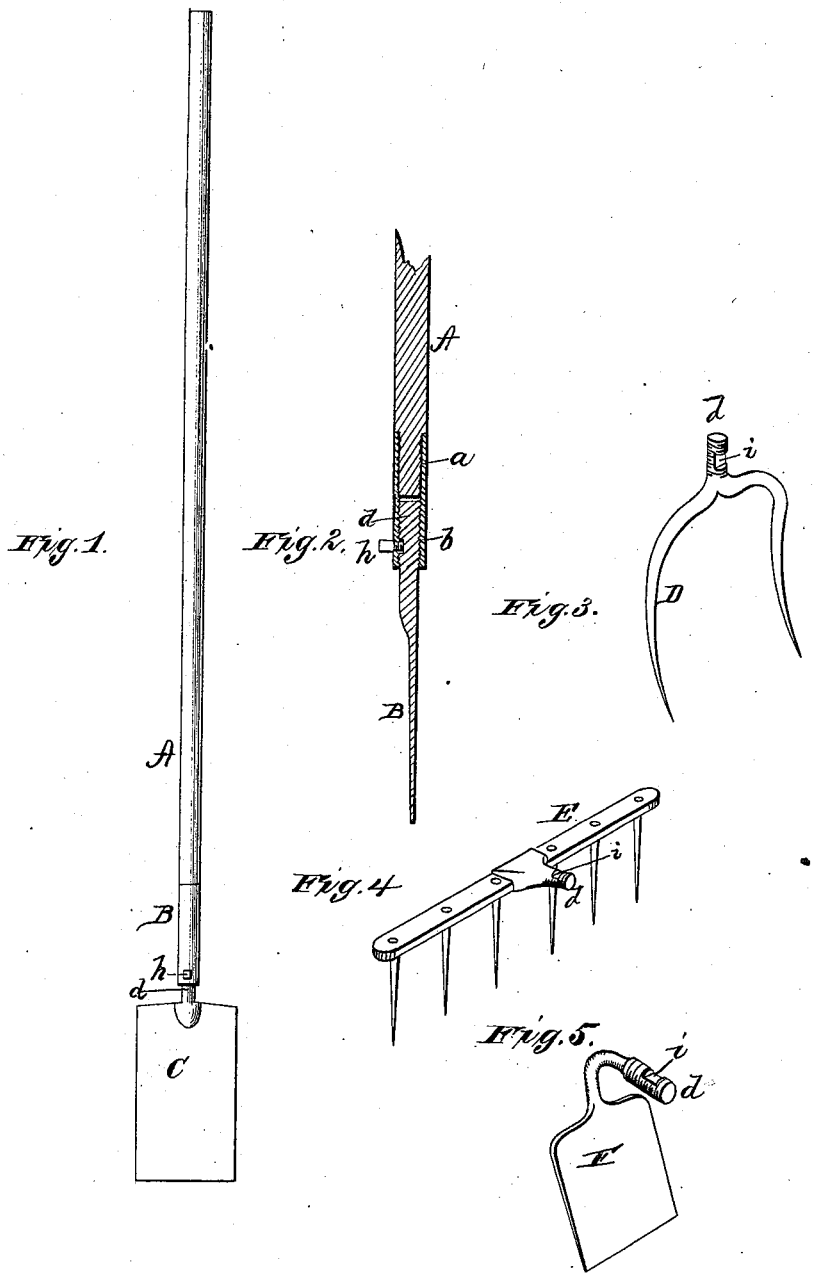

UNITED STATES PATENT OFFICE.

JAMES D. SHAFFER, OF SHELBYVILLE, KENTUCKY.

IMPROVEMENT IN GARDEN-TOOLS.

Specification forming part of Letters Patent No. 210,155, dated November 19, 1878; application filed August 15, 1878.

*To all whom it may concern:*

Be it known that I, JAMES D. SHAFFER, of Shelbyville, in the county of Shelby, and in the State of Kentucky, have invented certain new and useful Improvements in Garden-Tools; and do hereby declare that the following is a full, clear, and exact description thereof, reference being had to the accompanying drawings, and to the letters of reference marked thereon, making a part of this specification.

The nature of my invention consists in the construction and arrangement of a handle, ferrule, and shanks for farm and garden tools, as will be hereinafter more fully set forth.

In order to enable others skilled in the art to which my invention appertains to make and use the same, I will now proceed to describe its construction and operation, referring to the annexed drawing, in which—

Figure 1 is a front view of a spade connected to the handle. Fig. 2 is a section of the same. Figs. 3, 4, and 5 represent other garden-tools to be used with the same handle.

A represents a wooden handle, of any suitable dimensions, provided at its lower end with a ferrule, B, of cast or wrought iron. This ferrule may be of any desired length, and has two sets of female screw-threads, $a$ and $b$, extending from opposite ends inward for a suitable distance. The end of the handle A is screwed in the threads $a$, making the ferrule firm on the handle without screws or rivets, and no holes of any kind need to be made in the handle, which would weaken the same.

C represents a spade; D, a fork; E, a rake, and F a hoe. These tools are all provided with a screw-shank, $d$, of such size as to fit in the threads $b$ of the ferrule, and thus be screwed into the same to form connection with the handle. On one side the shank $d$ is made with a recess, $i$, or cut square, as shown, and a set-screw, $h$, is passed through the ferrule to enter said recess, whereby the tool is prevented from turning in the ferrule. It will readily be seen that by this means a firm and durable connection is formed between the tool and the handle, and one tool can easily and quickly be substituted for another.

In case of breakage of either tool or handle, the other part is good, and can be used again, thus saving considerable expense.

Having thus fully described my invention, what I claim as new, and desire to secure by Letters Patent, is—

The combination, with the handle A, of the ferrule B, having two sets of female threads, $a\ b$, and set-screw $h$, and a garden-tool provided with a screw-shank, $d$, having recess $i$, all substantially as and for the purposes herein set forth.

In testimony that I claim the foregoing I have hereunto set my hand this 15th day of June, 1878.

JAMES D. SHAFFER.

Witnesses:
JOHN H. COURTNEY,
JAMES E. MORRIS.